(12) United States Patent
Kim

(10) Patent No.: US 10,836,664 B2
(45) Date of Patent: Nov. 17, 2020

(54) HARDNESS REDUCTION FILTER

(71) Applicant: LG ELECTRONICS INC., Seoul (KR)

(72) Inventor: Sejoong Kim, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 248 days.

(21) Appl. No.: 16/011,051

(22) Filed: Jun. 18, 2018

(65) Prior Publication Data
US 2018/0362377 A1 Dec. 20, 2018

(30) Foreign Application Priority Data

Jun. 19, 2017 (KR) .......................... 10-2017-0077227

(51) Int. Cl.
*B01D 63/02* (2006.01)
*B01J 21/08* (2006.01)
*B01J 23/02* (2006.01)
*C02F 1/44* (2006.01)
*C02F 1/66* (2006.01)
(Continued)

(52) U.S. Cl.
CPC ................ *C02F 5/06* (2013.01); *B01D 63/02* (2013.01); *B01D 63/024* (2013.01); *B01J 21/08* (2013.01); *B01J 23/02* (2013.01); *C02F 5/083* (2013.01); *B01D 2313/42* (2013.01); *B01D 2325/028* (2013.01); *C02F 1/001* (2013.01); *C02F 1/444* (2013.01); *C02F 1/66* (2013.01);
(Continued)

(58) Field of Classification Search
CPC .. B01D 63/02; B01D 63/024; B01D 2313/42; B01D 2325/028; B01J 21/08; B01J 23/02; C02F 1/001; C02F 1/444; C02F 1/66; C02F 1/685; C02F 5/06; C02F 5/083; C02F 2101/10; C02F 2303/22
See application file for complete search history.

(56) References Cited

U.S. PATENT DOCUMENTS 5,152,904 A    10/1992 Kedem et al.
5,160,038 A *  11/1992 Harada .................. C02F 1/444
                                                210/149
(Continued)

FOREIGN PATENT DOCUMENTS

CN      102405193      4/2012
KR   10-1986-0008946   12/1986
(Continued)

OTHER PUBLICATIONS

Korean Office Action dated Jul. 20, 2018 issued in Application No. 10-2017-0077227.
(Continued)

*Primary Examiner* — Lucas A Stelling
(74) *Attorney, Agent, or Firm* — Ked & Associates LLP

(57) ABSTRACT

A hardness reduction filter is provided. The hardness reduction filter may include a filter housing having a space formed therein, a filter provided in the space of the filter housing to filter out foreign materials from water flowing into the filter housing, and hardness reduction catalysts provided between the filter housing and the filter and configured to perform at least one of removing a hard water material contained in the water or preventing formation of a scale inducing material in the water flowing into the filter housing.

19 Claims, 9 Drawing Sheets

(51) Int. Cl.
*C02F 1/68* (2006.01)
*C02F 5/06* (2006.01)
*C02F 5/08* (2006.01)
C02F 101/10 (2006.01)
C02F 1/00 (2006.01)

(52) U.S. Cl.
CPC .......... *C02F 1/685* (2013.01); *C02F 2101/10* (2013.01); *C02F 2303/22* (2013.01)

(56) References Cited

U.S. PATENT DOCUMENTS

| | | | |
|---|---|---|---|
| 2005/0077227 A1 | 4/2005 | Kirker et al. | |
| 2010/0263688 A1* | 10/2010 | Monsrud .................. | C02F 5/02 134/18 |
| 2011/0067732 A1* | 3/2011 | Smith ....................... | C02F 5/08 134/10 |

FOREIGN PATENT DOCUMENTS

| | | |
|---|---|---|
| KR | 10-2009-0025106 | 3/2009 |
| KR | 10-2015-0131809 | 9/2015 |
| KR | 10-2017-0030350 | 3/2017 |
| KR | 10-2017-0049230 | 5/2017 |
| WO | WO 2017/043803 | 3/2017 |
| WO | WO 2017/047953 | 3/2017 |

OTHER PUBLICATIONS

Indian Office Action dated Nov. 15, 2019 issued in Application No. 201814022708.
Australian Office Action dated Jun. 12, 2019 issued in Application No. 2018204380.

* cited by examiner

HARDNESS REDUCTION FILTER

CROSS-REFERENCE TO RELATED APPLICATION

This application claims priority under 35 U.S.C. § 119 to Korean Application No. 10-2017-0077227, filed on Jun. 19, 2017, whose entire disclosure is incorporated herein by reference.

BACKGROUND

1. Field

A hardness reduction filter is disclosed herein.

2. Background

Water hardness may be measured by converting amounts of calcium ions and magnesium ions contained in water into an amount of calcium carbonate ($CaCO_3$) (unit mg/l) corresponding thereto. Water hardness may influence taste of water. Water may be classified as water having a water hardness value higher than a predetermined criterion value, or "hard" water, and water having a water hardness value lower than a predetermined criterion value, or "soft" water. The World Health Organization (WHO) provides guidelines and criterion to further subdivide or classify hard water and soft water.

A "hard" water material reacts at a temperature higher or lower a room temperature to form a scale. The scale, such as, e.g., $CaCO_3$, refers to a material generated by combining minerals remaining in water after evaporation of water. The scale generated at an outlet of a water system, such as, for example, a refrigerator or a water purifier, may be perceived by a consumer as failure or performance degradation of the water system. Therefore, preventing the scale from being generated may be desired.

In a water cleaning system, such as, for example, a washing machine or a dishwasher, a hard water material may be combined with a negative ion of a detergent, thereby causing deterioration of washing capacity and generating insoluble detergent dirt. Therefore, removing the hard water material from the hard water to decrease water hardness may be desired.

FIG. 1 is a view showing a hardness reduction filter provided in a "water purifier capable of removing a hard material" disclosed in Korean Patent Application No. 10-2009-0025106, which is incorporated by reference herein. The hardness reduction filter shown in FIG. 1 may be characterized in that an ion exchange resin 121 may be applied to an outer surface of a reverse osmosis membrane to prevent a hard material from being generated on a reverse osmosis surface.

However, in the hardness reduction filter of FIG. 1, when the ion exchange resin 121 is used, other ion-exchanged materials, such as, for example, sodium, may be regenerated and eluted in water. In addition, it may be difficult to apply the reverse osmosis filter to a direct type product. Since water is purified using a high-pressure pump, a surface of a membrane may be damaged by the ion exchange resin. It may also be difficult to make the filter compact.

FIG. 2 is a view showing a composite hardness reduction filter disclosed in Korean Patent Application No. 10-2015-0131809, which is incorporated by reference herein. The composite hardness reduction filter shown in FIG. 2 may be characterized in that a cylindrical injected part 124 may be installed in a flow passage located at a center of a carbon block, and a hardness reduction catalyst may be put into the cylindrical injected part 124 to remove hardness inducing materials such as, for example, calcium ions or magnesium ions, contained water.

However, in such a filter, it may be difficult to install the cylindrical injected part 124 at the center of the carbon block and to put the hardness reduction catalyst into the cylindrical injected part 124. When aragonite generated by the hardness reduction catalyst flows into the flow passage in a water pipe without being filtered out, the aragonite may be moved into gaps of various valves and pipe connectors, thereby causing water leakage. In addition, after passing through an activated carbon block, a removal rate of the hardness inducing material may be low at a hydrogen ion index (ph) of a neutral region.

The above references are incorporated by reference herein where appropriate for appropriate teachings of additional or alternative details, features and/or technical background.

BRIEF DESCRIPTION OF THE DRAWINGS

The embodiments will be described in detail with reference to the following drawings in which like reference numerals refer to like elements, and wherein.

DETAILED DESCRIPTION

Figure 1:
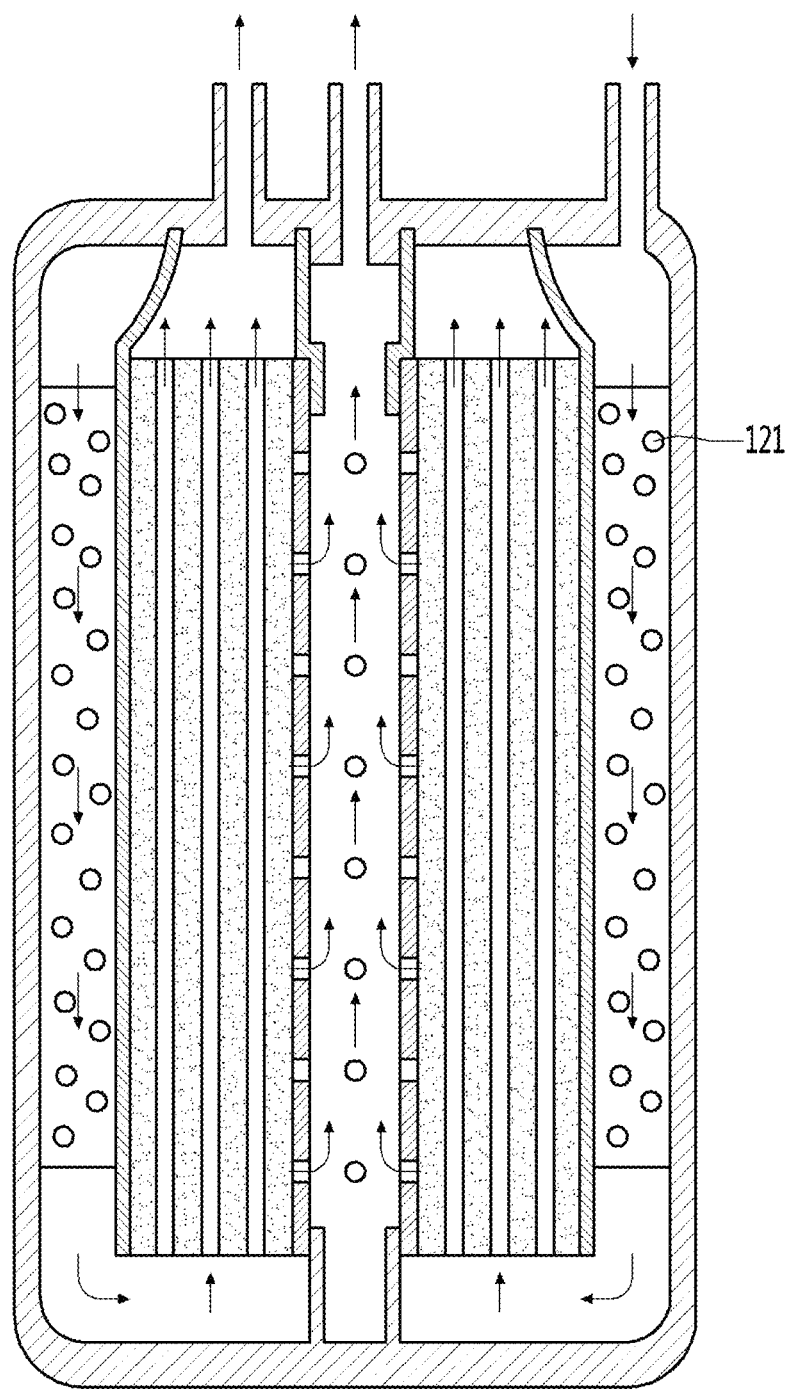
FIG. 1 and FIG. 2 are views of filters having a hardness reduction function.
Figure 2:
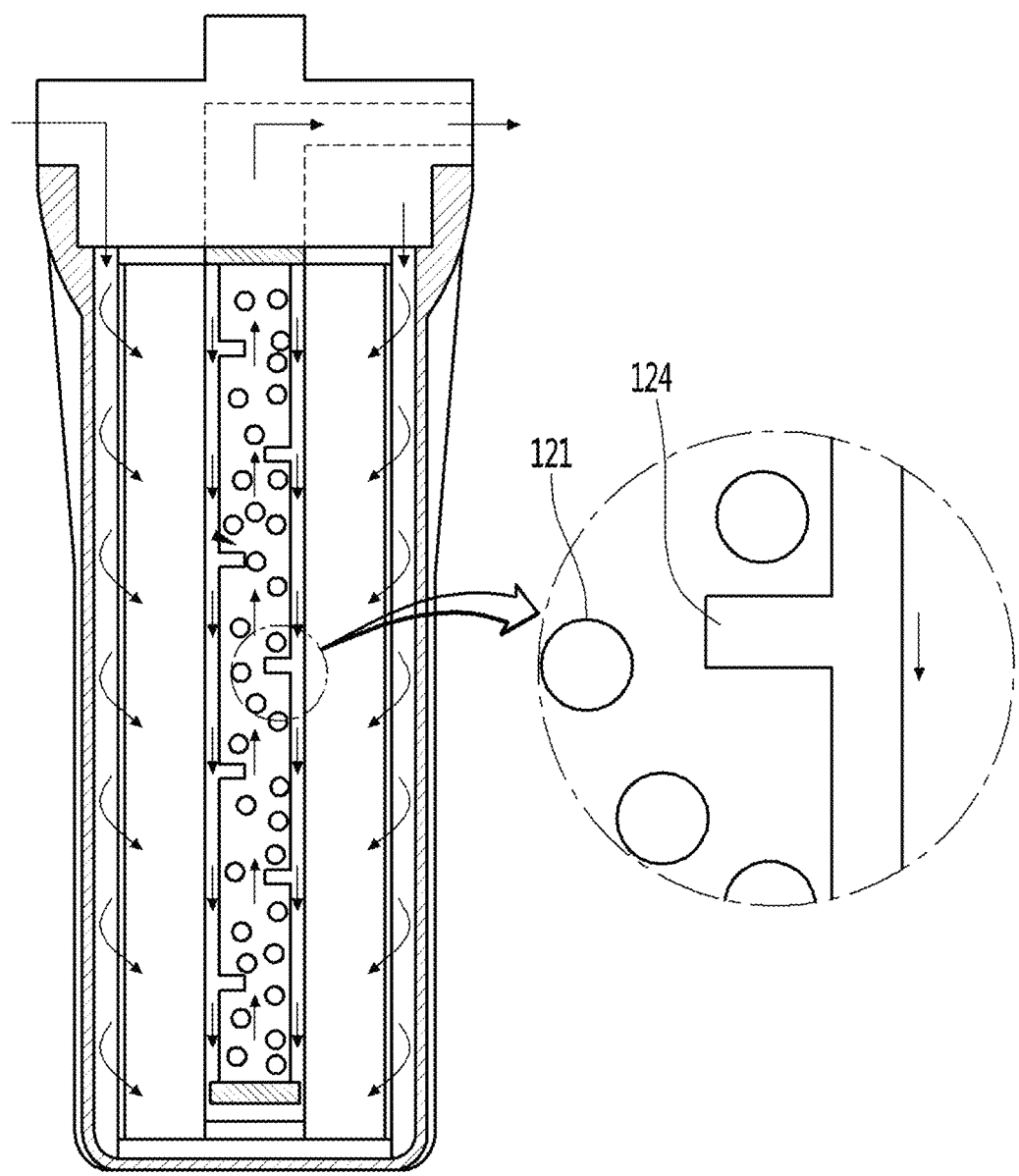

Hereinafter, some embodiments of the present disclosure will be described in detail with reference to exemplary drawings. In adding reference numerals to the constituent elements of the drawings, same constituent elements may be denoted by the same reference numerals whenever possible, even if they are shown in different drawings. In the following description of the embodiments of the present disclosure, well-known functions or constructions may not be described in detail since they may obscure the understanding of the embodiments of the present disclosure.

The hardness reduction filter according to embodiments disclosed herein may be applicable to various water treatment apparatuses, such as, for example, a water purifier and a water softener. In addition, the hardness reduction filter may be installed in, for example, a washing machine, a dishwasher, a refrigerator, and a bidet. Although the hardness reduction filter according embodiments may be applied to a water purifier as an example, the scope of the present disclosure is not limited thereto and the hardness reduction filter may be applicable to various apparatuses for lowering the hardness of raw water.

Figure 3:
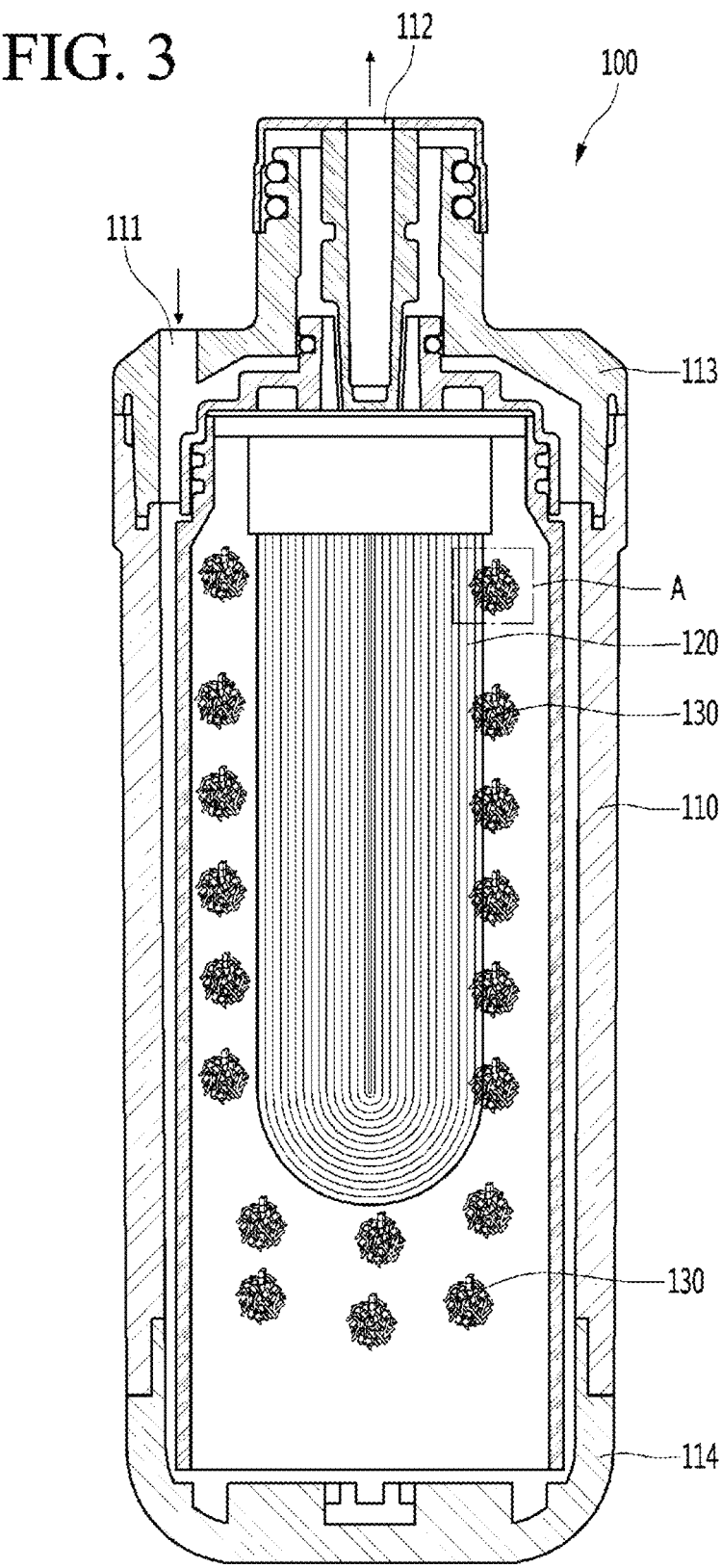
FIG. 3 is a cross-sectional view of a hardness reduction filter according to an embodiment.
Figure 4:
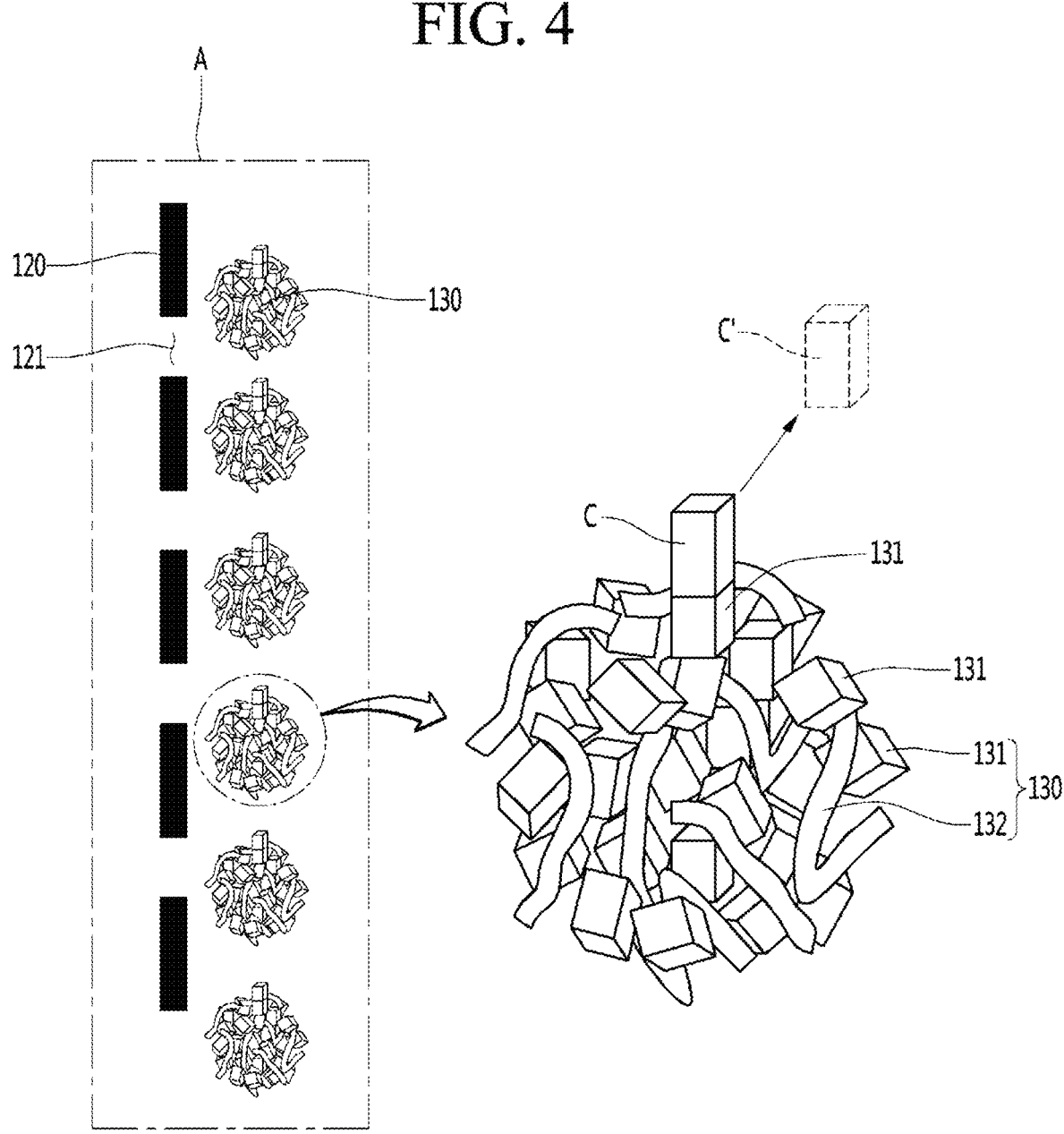
FIG. 4 is an enlarged view of a region "A" of FIG. 3.

Referring to FIG. 3 and FIG. 4, a hardness reduction filter or water softener filter 100 according to an embodiment may include a filter housing 110, a filter member or filter 120 and hardness reduction catalysts 130 provided between the filter housing 110 and the filter member 120. In the filter housing 110, an internal space and an inlet 111 and an outlet 112 communicating with the internal space may be formed. Accordingly, raw water may be introduced into the internal space via the inlet 111, and water purified through filtering may be discharged through the outlet 112. That is, raw water may be purified by the filter member 120 while flowing between the inlet 111 and the outlet 112 and then may be discharged.

The filter housing 110 may have a space in which the filter member 120 may be housed and may include an upper cap 113 with the inlet 111 and the outlet 112 formed therein. The space of the filter housing 110 may communicate with the outside through the inlet 111 and the outlet 112 of the upper cap 113. When the upper cap 113 is provided as described above, by opening the upper cap 113, the filter member 120 may be easily installed in the space of the filter housing 110 and the filter member 120 housed in the filter housing 110 may be easily replaced.

The filter housing 110 may include a lower cap or bottom 114. The filter housing 110 may have opened upper and lower portions and may have a cylindrical shape. The opened upper and lower portions of the filter housing 110 may be shielded by the upper cap 113 and the lower cap 114, respectively. If the lower cap 114 is provided, the lower cap 114 may be opened, and the filter member 120 may be easily installed or replaced in the space of the filter housing 110. In addition, the hardness reduction catalysts 130 and an edible acid discharge member or discharger 140 may be easily carried into or out of the filter housing 110.

Alternatively, a lower cap of a filter, such as, for example, a hollow fiber membrane filter may be opened and particle-type hardness reduction catalysts 130 or hydrogel-type edible acid discharge member 140 may be carried into the filter housing 110, such that the filter may have hardness reduction capacity to reduce hardness of water passing through the filter.

The filter housing 110 may have a flow passage structure in which raw water flows upward from a bottom thereof, that is, an up-flow structure. The filter member 120 may be housed in the space of the filter housing 110. The filter member 120 may filter out various kinds of foreign materials contained in raw water flowing into the filter housing 110, according to various embodiments.

For example, the filter member 120 may include a hollow fiber membrane. The hollow fiber membrane may filter out, for example, parts of organic and heavy metals, various bacteria, and impurities using a hollow fiber and may leave behind minerals beneficial to a human body. However, it may be difficult for the hollow fiber membrane to remove a hardness inducing material contained in water.

The hardness reduction catalysts 130 may be put into the filter, thereby reducing water hardness. By adding a hardness reduction function to a hollow fiber membrane filter, it may be possible to improve clogging of a water pipe and a filter due to a hardness inducing material and to reduce aesthetic adverse effects due to a hard material such as a white mineral build-up generated when an icemaker and a water purifier are used.

The hardness reduction catalysts 130 for removing a hard water material or a scale inducing material contained in raw water flowing into the filter housing 110 may be provided between the filter housing 110 and the filter member 120. The hardness reduction catalysts 130 crystallize the hard water material or the scale inducing material such that the hard water material or the scale inducing material contained in raw water flowing into the filter housing 110 does not pass through the filter member 120. The hardness reduction catalysts 130 may crystallize the hard material or the scale inducing material contained in raw water, according to various embodiments.

The hardness reduction catalysts 130 may be provided in the filter housing 110 in various forms. For example, the hardness reduction catalysts 130 may be provided in the filter housing 110 in the form of particles. A catalyst refers to a material for promoting or suppressing a chemical reaction, and remains intact without being mixed with a product after reaction. The hardness reduction catalysts 130 may promote crystallization of the hard water material or the scale inducing material, and remain intact without being mixed with a product after the reaction.

If a crystal C generated by promoting crystallization is separated from the hardness reduction catalyst 130, the hardness reduction catalyst 130 may participate in another catalytic reaction. Accordingly, in order to improve the hard water material or scale inducing material removing performance of the hardness reduction catalyst 130, it may be necessary to rapidly separate the crystal C from the hardness reduction catalyst 130.

According to embodiments, the crystal C generated on a surface of the hardness reduction catalyst 130 may be separated by collision between the particle-type hardness reduction catalysts 130, and the hardness reduction catalysts 130 may be regenerated. For example, if the filter housing 110 has a flow passage structure in which raw water flows upward from the bottom as described above, the raw water flowing upward in the flow passage structure may provide buoyancy to the hardness reduction catalysts 130. The flow of the hardness reduction catalysts 130 becomes active by buoyancy, and thus, the hardness reduction catalysts 130 may collide with each other, thereby separating the crystals C from the hardness reduction catalysts 130.

That is, the hardness reduction catalysts 130 may naturally collide with each other using buoyancy provided by the raw water flowing into the filter housing 110 without applying external force, thereby separating the crystals C from the hardness reduction catalysts 130 and regenerating the hardness reduction catalysts 130. The hardness reduction catalyst 130 may have a specific gravity similar to that of water. Accordingly, when the filter housing 110 is filled with water, the hardness reduction catalysts 130 may freely flow in the water and collide with each other, thereby separating the crystals C.

A size of the hardness reduction catalyst 130 may be greater than that of a fine hole 121 formed in the filter member 120 for passage of water. Accordingly, when the raw water flowing into the filter housing 110 passes through the filter member 120, the hardness reduction catalysts 130 may remain between the filter member 120 and the filter housing 110 without passing through the filter member 120.

A size of the crystal (hereinafter, may be referred to as "aragonite") separated from the hardness reduction catalyst 130 may also be greater than that of the fine hole 121 formed in the filter member 120 for passage of water. Accordingly, when the raw water flowing into the filter housing 110 passes through the filter member 120, the aragonite C' separated from the hardness reduction catalyst 130 may remain between the filter member 120 and the filter housing 110 without passing through the filter member 120.

The separated aragonite C' may be filtered out by the filter member 120 and may be adhered to a surface of the filter member 120, thereby suppressing generation of microorganisms. The aragonite C' may have an acicular structure (see FIG. 8). When the aragonite C' having the acicular structure is adhered to the surface of the filter member 120, it may be possible to suppress adhesion and generation of microorganisms.

When generation of microorganisms is suppressed, hygienic safety may be realized, and a problem that filtering capacity is lowered by microorganisms may be solved. Therefore, it may be possible to improve the filtering efficiency of the filter member 120. In addition, it may prevent a phenomenon in which a flow rate of water passing through the filter is reduced by microorganisms.

The hardness reduction catalyst 130 may include calcium carbonate ($CaCO_3$) or magnesium carbonate ($MgCO_3$). In addition, the hardness reduction catalyst 130 may include a silicate-based support, and calcium carbonate ($CaCO_3$) or magnesium carbonate ($MgCO_3$) may be formed on the surface of the support.

The hardness reduction catalysts 130 may be in the form of particles by combining several catalyst particles 131 including the calcium carbonate ($CaCO_3$) or magnesium carbonate ($MgCO_3$) formed on the surface of the support. At this time, the catalyst particles 131 may be bonded to each other or bound through a binder 132.

Since the hardness reduction catalysts 130 formed in the form of particles may be directly carried into the filter housing 110, a structure for installing the hardness reduction catalysts 130 may not be necessary. When water flows into the filter housing 110, aragonite may be generated on the surface of the hardness reduction catalyst 130 and the generated aragonite may be separated due to collision between particles according to the flow of water and thus the surface of the catalyst 130 may be regenerated.

In addition, it may be possible to suppress growth of microorganisms on the surface of the filter member 120, such as, for example, the hollow fiber membrane. As the aragonite having a size of several micrometers is adhered to the surface of the filter member 120, it may be possible to suppress biofilm contamination of the membrane due to adhesion of microorganisms to the surface of the filter member 120 and to reduce a phenomenon in which a flow rate of water is reduced when the filter is used.

Figure 5:
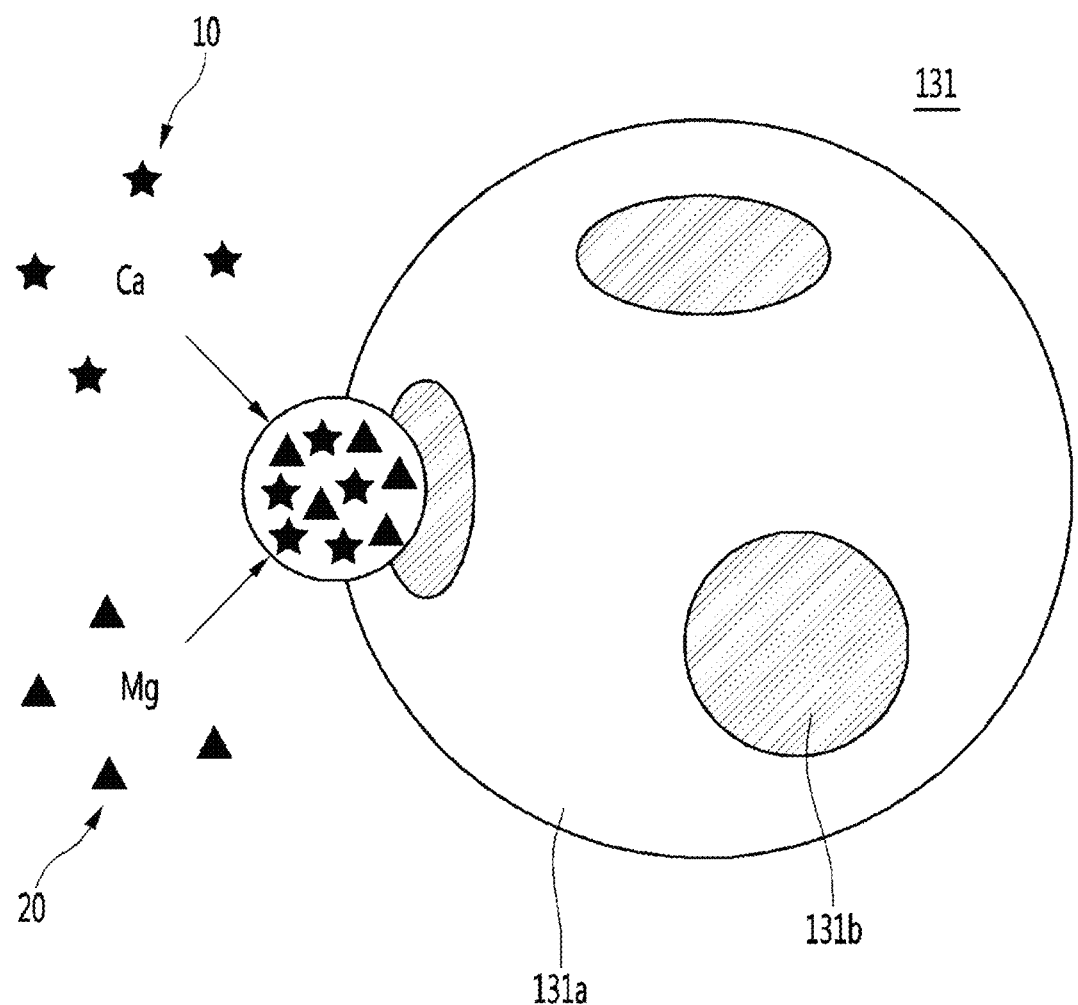
FIG. 5 is a conceptual view of a mechanism of a hardness reduction catalyst.

A mechanism for removing a hard water material or a scale inducing material from raw water by the hardness reduction catalyst 130 is described with reference to FIG. 5. The hardness reduction catalyst 130 may include a support 131a such as, for example, a catalyst support, a carrier, or a supporting material, and a crystalline seed 131b.

The support 131a may be made of a negatively charged polymer. The hard water material or the scale inducing material, such as, for example, a calcium cation 10 or a magnesium cation 20, may be positively charged. Accordingly, if the support 131a is made of a negatively charged polymer, the support 131a may attract the hard water material or the scale inducing material by electrostatic attraction. The negatively charged polymer may include polyacrylate, for example.

The crystalline seed 131b may be an inorganic material for crystallizing the hard water material or the scale inducing material. The crystalline seed 131b may include at least one of calcium and magnesium. For example, the crystalline seed 131b may include at least one of calcium carbonate ($CaCO_3$) crystal or magnesium carbonate ($MgCo_3$) crystal.

When the hard water material or the scale inducing material contained in raw water, such as a calcium cation 10 or a magnesium cation 20, collects on the support 131a by electrostatic attraction, upon approaching the hardness reduction catalyst 130, the support 131a with the crystalline seed 131b and the hard water material or the scale inducing material may be crystallized by the crystalline seed 131b. The crystallization formula of the hard water material or the scale inducing material may be expressed by Formulas 1 and 2. For reference, in the Formulas below, MEDIA indicates the crystalline seed 131b.

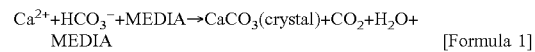

$$Ca^{2+}+HCO_3^-+MEDIA \rightarrow CaCO_3(crystal)+CO_2+H_2O+MEDIA \quad \text{[Formula 1]}$$

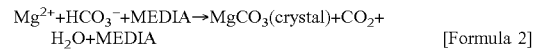

$$Mg^{2+}+HCO_3^-+MEDIA \rightarrow MgCO_3(crystal)+CO_2+H_2O+MEDIA \quad \text{[Formula 2]}$$

The hardness reduction catalyst 130 may promote the reaction between the calcium cation ($Ca^{2+}$) contained in the raw water and bicarbonate anion ($HCO^{3+}$) as shown in Formula 1. In addition, the hardness reduction catalyst 130 may promote the reaction of the magnesium cation ($Mg^{2+}$) contained in the raw water and bicarbonate anion ($HCO^{3-}$) as shown in Formula 2. The hardness reduction catalyst 130 may contribute to crystallization of the hard water material or the scale inducing material through promotion of the reaction of Formula 1 and the reaction of Formula 2.

The crystal C may be separated from the hardness reduction catalyst 130 by the active flow of raw water. The crystal C separated from the hardness reduction catalyst 130 may be mechanically filtered out by the filter member 120.

Figure 6:
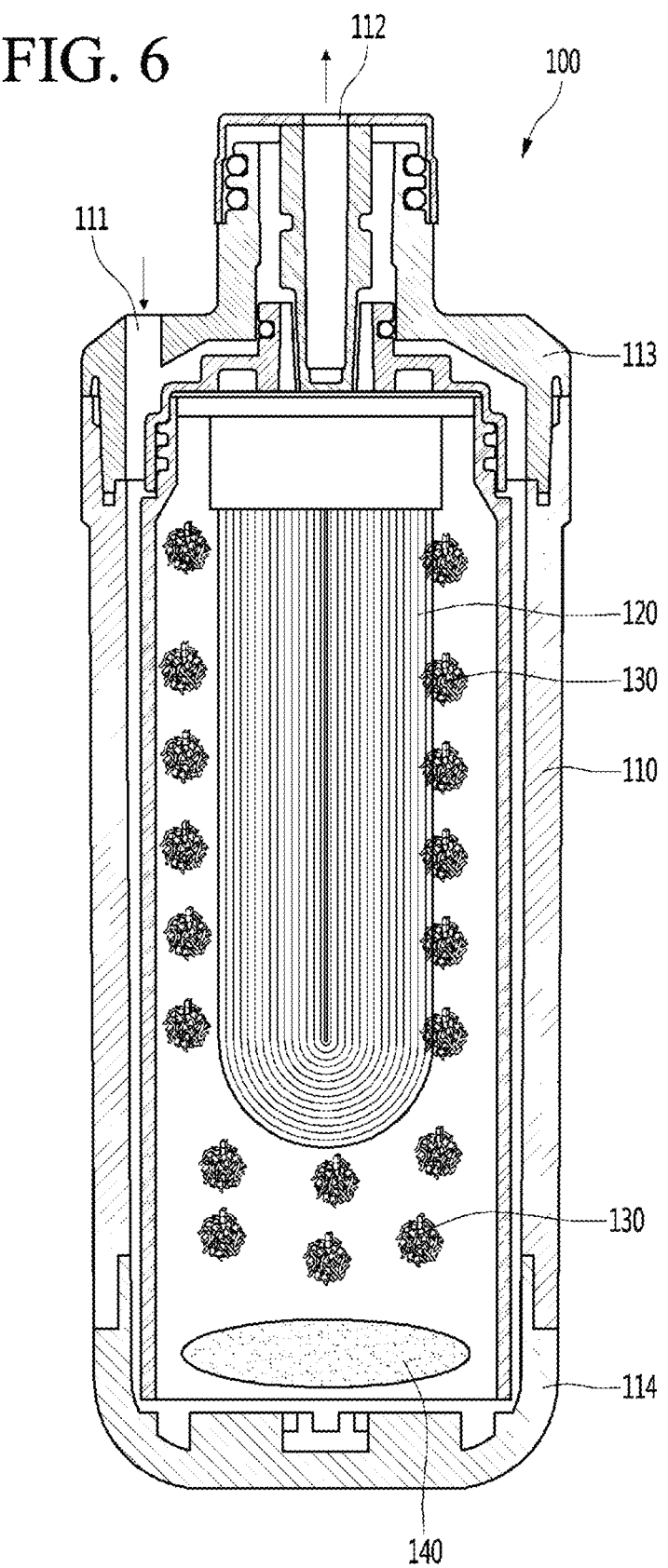
FIG. 6 is a cross-sectional view of a hardness reduction filter according to another embodiment.

Hereinafter, another embodiment is described with reference to FIG. 6 and FIG. 7. The filter housing 110 may further include an edible acid discharge member 140 for discharging edible acid into water when water flows into the filter housing 110. The edible acid may include at least one selected from between citric acid and maleic acid.

When the edible acid discharge member 140 is provided as described above, the edible acid may be discharged into the water, and a pH of the water may be slightly acidic. When the filter housing 110 is filled with water, the edible acid discharge member 140 may discharge the edible acid into the water according to various embodiments.

For example, the edible acid discharge member 140 may be in the form of a hydrogel. Accordingly, when the filter housing 110 is filled with water, the edible acid contained in the hydrogel-type edible acid discharge member 140 may be eluted in water. For example, the hydrogel-type edible acid discharge member 140 may be formed by combining edible acid with chitosan or alginate.

The edible acid may chemically absorb the hardness inducing material contained in raw water, thereby contributing to ionization of the hardness inducing material. That is, it may be possible to temporarily suppress crystallization of the hardness inducing material contained in raw water.

Figure 7:
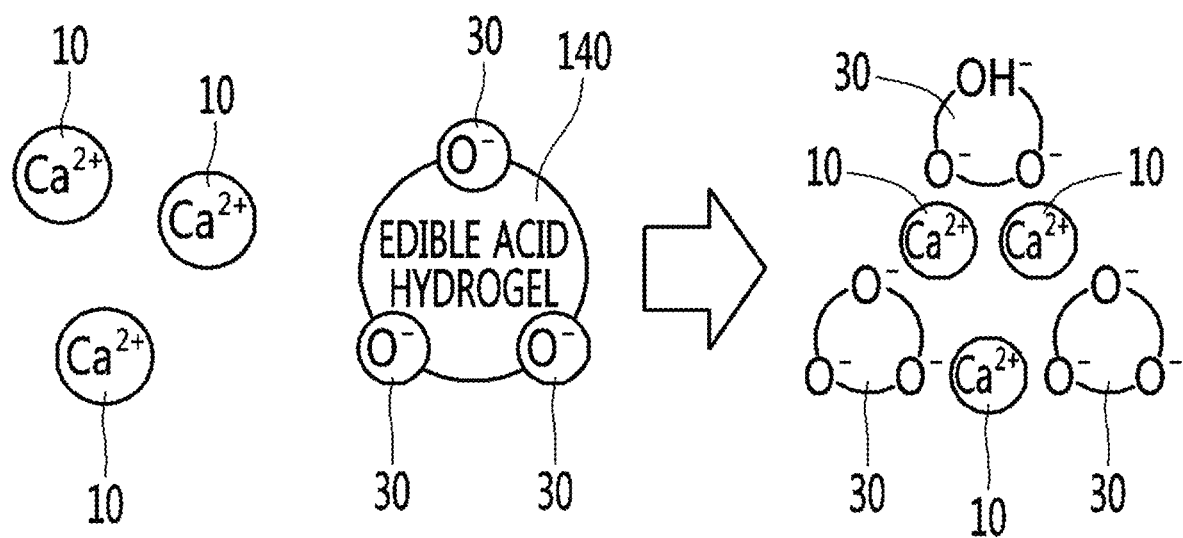
FIG. 7 is a conceptual view of a mechanism of an edible acid discharge member.

Referring to FIG. 7, the edible acid 30 discharged from the edible acid discharge member 140 may be in the form of an anion and may chemically absorb the cationic hardness inducing material 10. Accordingly, the hardness inducing material 10 may not be crystallized into calcite and may be maintained in an ionized state. The cationic hardness inducing material 10 may be continuously maintained in the ionized state by the edible acid 30, or the hardness reduction catalyst 130 may be crystallized to aragonite and the aragonite may be separated from the hardness reduction catalyst 130 by collision between the hardness reduction catalysts 130 and then may be filtered out by the filter member 120. The hardness inducing material may include a calcium cation or a magnesium cation.

Hereinafter, methods of manufacturing the edible acid hydrogel which is a component of the present disclosure are described.

Embodiment 1

First, after chitosan is dissolved in acetic acid such that a content of the chitosan becomes 1 to 2.5 wt %, edible acid, such as, for example, citric acid or malic acid, is added to a chitosan solution such that an amount of edible acid is 1 or 2 mol per chitosan of $3.5 \times 10^{-3}$ mol. Sesame oil of 15 to 40 mL is added to the mixture while slowly stirring the mixture and is mixed for 10 to 15 minutes at 0° C., thereby forming an emulsion. The formed emulsion is added to a sesame oil solution having a volume range of 150 to 200 mL and is strongly mixed for 35 to 40 minutes at 120° C. to form a hydrogel, and then the hydrogel is washed with distilled water.

Embodiment 2

First, alginate is added to a P-benzoquinone solution in a range of 0.006 to 0.009 M such that an alginate content is 3 to 5 wt %, an alginate functional group is activated, and then drying is performed for two hours at 45° C. such that the content of the alginate finally becomes 2 wt %. The activated alginate solution is added to the acetic acid solution containing chitosan of 0.3 to 0.6 wt % dissolved therein and is agitated such that the content of the alginate finally becomes 0.1 to 0.5 wt %. Calcium chloride of 2 to 4 wt % and edible acid, such as, for example, citric acid or malic acid, is slowly added while being agitated to maintain the pH of 5 at 40° C., is left for 1 to 2 hours at 25° C. to generate a hydrogel, and then the hydrogel is washed with distilled water.

As described above, the edible acid hydrogel may be obtained by combining edible acid, such as citric acid or maleic acid, with chitosan or alginate. When the hydrogel is present in water, the edible acid therein may be slightly eluted according to the pH, the temperature, etc. and, as a result, the pH of water contained in the filter housing 110 may be maintained at a slightly acidic level.

Since the eluted edible acid absorbs the hardness inducing material (for example, calcium ions or magnesium ions), it may be possible to prevent crystallization of the hardness inducing material. The hardness inducing material contained in water passing through the filter may be converted into aragonite by the hardness reduction catalyst, and the aragonite may be separated by collision between particles when the size thereof is increased, thereby removing the hardness inducing material contained in water and reducing water hardness.

In addition, the hardness reduction catalyst 130 and the aragonite separated from the hardness reduction catalyst 130 may be adhered to the surface of the filter member 120, such as, for example, the hollow fiber membrane, thereby suppressing growth of microorganisms on the surface of the filter, preventing a phenomenon in which a flow rate of water is reduced due to contamination caused by microorganisms, and increasing the lifespan of the filter.

Figure 8:
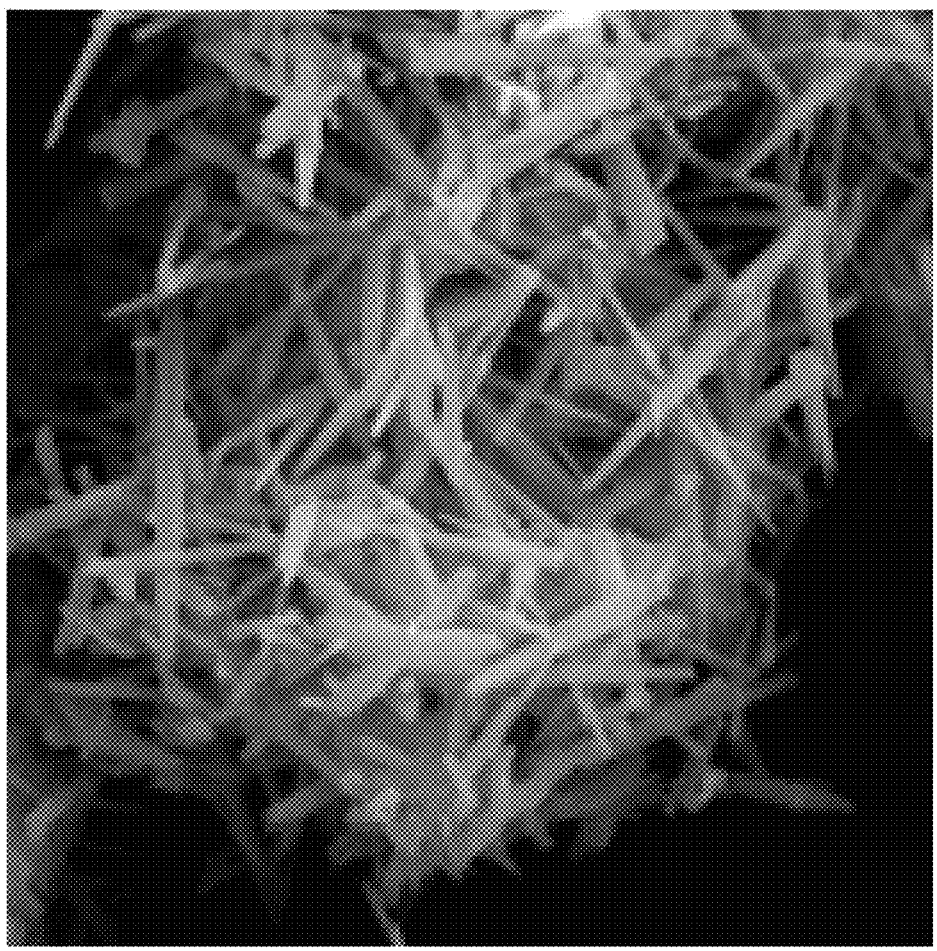
FIG. 8 is a view showing aragonite having an acicular structure.
Figure 9:
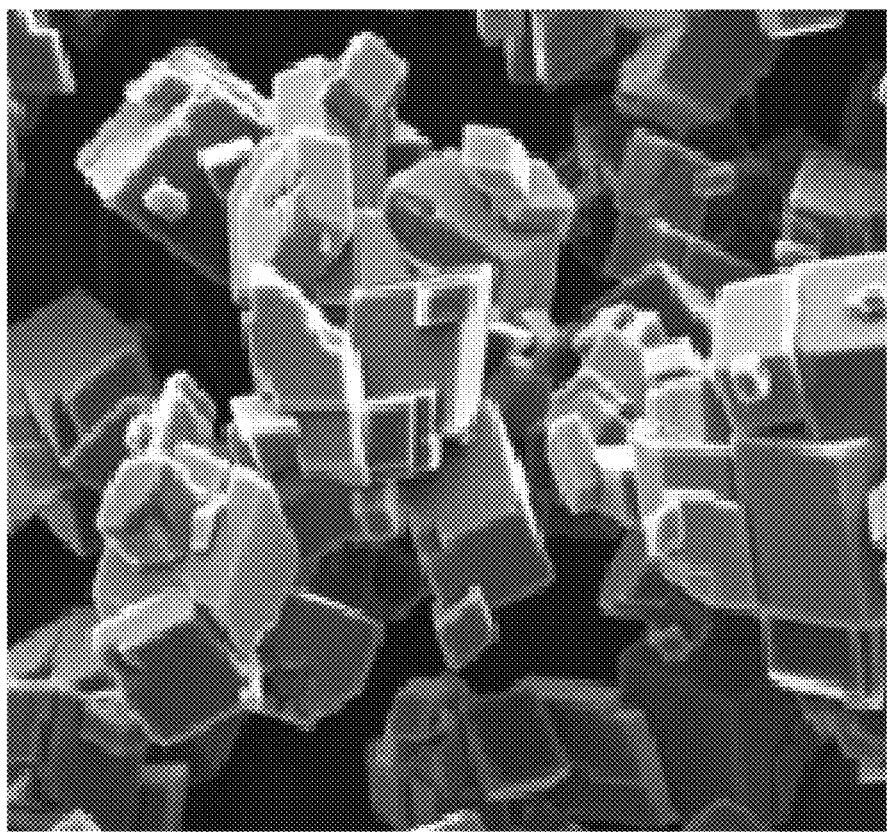
FIG. 9 is a view showing calcite having a plate-like structure.

FIG. 8 is a view showing aragonite having an acicular structure, and FIG. 9 is a view showing calcite having a plate-like structure. Referring to FIG. 8 to FIG. 9, the aragonite, which grows at a relatively high rate by the crystal generation catalyst 130, has a size of 0.05 to several tens of micrometers (µm) in a longitudinal direction. When the aragonite is taken out from the water purifier without being filtered out and is dried or heated, the aragonite may be converted into calcite, and white powder may be provided to the consumer, thereby causing an adverse aesthetic effect.

Accordingly, when the aragonite is put into the carbon block, the aragonite may flow out without being filtered out. Since the internal flow passage of the carbon block may be narrow, and the carbon block does not have a structure for flowing the aragonite, the performance of the crystal generation catalyst 130 may be lowered.

For example, the acicular aragonite generated on the surface of the catalyst may be continuously stacked and may be converted into calcite having a rounded shape. In contrast, when the membrane filter is applied, the acicular aragonite generated on the surface of the catalyst while flowing between hollow fiber membranes may be swept away to maintain the performance of the catalyst and the generated aragonite may be physically filtered out by the pores of the hollow fiber membrane and may not flow out.

That is, as shown in FIG. 8 to FIG. 9, it may be possible to suppress performance degradation of the membrane, which may be caused by adhesion of microorganisms or other rust components, by adhering the acicular aragonite to the surface of the membrane. In addition, the edible acid eluted from the edible acid hydrogel may chemically absorb the hardness inducing material contained in water to prevent calcite from being generated, and the ionized hardness inducing material may be removed while the hardness reduction catalyst is converted into aragonite, thereby more efficiently reducing water hardness.

It may be possible to increase the removal rate of the hard water material, which may be hardly removed in a neutral region, by converting raw water into slightly acid water within an edible water quality criterion. In addition, it may be possible to suppress generation of a hard water material by use of the edible acid.

Embodiments disclosed herein provide a hardness reduction filter capable of reducing water hardness while filtering out foreign materials from raw water. Embodiments disclosed herein also provide a hardness reduction filter capable of being easily applied to a conventional filter without a hardness reduction function. Embodiments disclosed herein further provide a hardness reduction filter capable of preventing microorganisms from growing on a surface of the filter.

Embodiments disclosed herein provide a hardness reduction filter capable of preventing the filtering capacity and flow rate of the filter from being lowered by microorganisms. Embodiments disclosed herein also provide a hardness reduction filter in which a filter member, a hardness reduction catalyst, and an edible acid hydrogel may be easily carried into a filter housing and then may be easily taken out of the filter housing. Embodiments disclosed herein provide a hardness reduction filter capable of suppressing generation of a hard water material.

Embodiments disclosed herein further provide a hardness reduction filter capable of generating aragonite having a smaller cross section and a larger thickness than calcite to reduce clogging of the filter. Embodiments disclosed herein also provide a hardness reduction filter capable of regenerating hardness reduction catalysts as the hardness reduction catalysts flow and collide due to flow of raw water and aragonite is separated from the hardness reduction catalyst.

According to embodiments disclosed herein, a hardness reduction filter may include a filter housing having a space formed therein, a filter member provided in the space of the filter housing to filter out foreign materials from raw water flowing into the filter housing, and hardness reduction catalysts provided between the filter housing and the filter member to remove a hard material or a scale inducing material contained in the raw water flowing into the filter housing. The filter member may be made of a hollow fiber membrane.

The hardness reduction catalysts may be formed in the form of particles. Sizes of the hardness reduction catalysts may be greater than a fine hole formed such that water passes through the filter member.

Aragonite generated on a surface of each of the hardness reduction catalysts may be separated by collision between particles, and the hardness reduction catalysts may be regenerated. The separated aragonite may be filtered by the filter member and may be adhered to the surface of the filter member to suppress generation of microorganisms.

Each of the hardness reduction catalysts may include calcium carbonate ($CaCO_3$) or magnesium carbonate ($MgCO_3$). Each of the hardness reduction catalysts may include a silicate-based support and calcium carbonate ($CaCO_3$) or magnesium carbonate ($MgCO_3$) may be formed on a surface of the support. Each of the hardness reduction catalysts may have a specific gravity similar to that of water.

An edible acid discharge member for discharging edible acid into water when water flows into the filter housing may be further provided in the filter housing. The edible acid may include at least one selected from between citric acid and maleic acid.

The edible acid discharge member may be formed in the form of a hydrogel and the edible acid may be eluted in water. The edible acid discharge member may be formed by combining edible acid with chitosan or alginate. The edible acid may be combined with a hardness inducing material contained the raw water to be crystallized. The hardness inducing material may include a calcium ion or a magnesium ion.

It will be understood that when an element or layer is referred to as being "on" another element or layer, the element or layer can be directly on another element or layer or intervening elements or layers. In contrast, when an element is referred to as being "directly on" another element or layer, there are no intervening elements or layers present. As used herein, the term "and/or" includes any and all combinations of one or more of the associated listed items.

It will be understood that, although the terms first, second, third, etc., may be used herein to describe various elements, components, regions, layers and/or sections, these elements, components, regions, layers and/or sections should not be limited by these terms. These terms are only used to distinguish one element, component, region, layer or section from another region, layer or section. Thus, a first element, component, region, layer or section could be termed a second element, component, region, layer or section without departing from the teachings of the present disclosure.

Spatially relative terms, such as "lower", "upper" and the like, may be used herein for ease of description to describe the relationship of one element or feature to another element(s) or feature(s) as illustrated in the figures. It will be understood that the spatially relative terms are intended to encompass different orientations of the device in use or operation, in addition to the orientation depicted in the figures. For example, if the device in the figures is turned over, elements described as "lower" relative to other elements or features would then be oriented "upper" relative the other elements or features. Thus, the exemplary term "lower" can encompass both an orientation of above and below. The device may be otherwise oriented (rotated 90 degrees or at other orientations) and the spatially relative descriptors used herein interpreted accordingly.

The terminology used herein is for the purpose of describing particular embodiments only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

Embodiments of the disclosure are described herein with reference to cross-section illustrations that are schematic illustrations of idealized embodiments (and intermediate structures) of the disclosure. As such, variations from the shapes of the illustrations as a result, for example, of manufacturing techniques and/or tolerances, are to be expected. Thus, embodiments of the disclosure should not be construed as limited to the particular shapes of regions illustrated herein but are to include deviations in shapes that result, for example, from manufacturing.

Unless otherwise defined, all terms (including technical and scientific terms) used herein have the same meaning as commonly understood by one of ordinary skill in the art to which this disclosure belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

Any reference in this specification to "one embodiment," "an embodiment," "example embodiment," etc., means that a particular feature, structure, or characteristic described in connection with the embodiment is included in at least one embodiment. The appearances of such phrases in various places in the specification are not necessarily all referring to the same embodiment. Further, when a particular feature, structure, or characteristic is described in connection with any embodiment, it is submitted that it is within the purview of one skilled in the art to effect such feature, structure, or characteristic in connection with other ones of the embodiments.

Although embodiments have been described with reference to a number of illustrative embodiments thereof, it should be understood that numerous other modifications and embodiments can be devised by those skilled in the art that will fall within the spirit and scope of the principles of this disclosure. More particularly, various variations and modifications are possible in the component parts and/or arrangements of the subject combination arrangement within the scope of the disclosure, the drawings and the appended claims. In addition to variations and modifications in the component parts and/or arrangements, alternative uses will also be apparent to those skilled in the art.

What is claimed is:

1. A hardness reduction filter, comprising:
a filter housing having a space formed therein;
a filter provided in the space of the filter housing to filter out foreign materials from water flowing into the filter housing;
an edible acid discharge member provided in the filer housing that discharges an edible acid into water when water flows into the filter housing, and
hardness reduction catalysts provided between the filter housing and the filter and configured to perform at least one of removing a hard water material contained in the water or preventing formation of a scale inducing material in the water flowing into the filter housing.

2. The hardness reduction filter according to claim 1, wherein the filter is made of a hollow fiber membrane.

3. The hardness reduction filter according to claim 1, wherein the hardness reduction catalysts are in the form of particles.

4. The hardness reduction filter according to claim 3, wherein sizes of the hardness reduction catalysts are greater than sizes of holes formed in the filter that allow water to pass through the filter.

5. The hardness reduction filter according to claim 3, wherein aragonite generated on a surface of each of the hardness reduction catalysts is separated by collision between particles of the hardness reduction catalysts and the hardness reduction catalysts are regenerated.

6. The hardness reduction filter according to claim 5, wherein the separated aragonite is filtered by the filter and is adhered to the surface of the filter to suppress generation of microorganisms.

7. The hardness reduction filter according to claim 1, wherein each of the hardness reduction catalysts includes calcium carbonate ($CaCO_3$) or magnesium carbonate ($MgCO_3$).

8. The hardness reduction filter according to claim 5, wherein each of the hardness reduction catalysts includes a silicate-based support, and calcium carbonate ($CaCO_3$) or magnesium carbonate ($MgCO_3$) is formed on a surface of the silicate-based support.

9. The hardness reduction filter according to claim 1, wherein each of the hardness reduction catalysts has a specific gravity similar to a specific gravity of water.

10. The hardness reduction filter according to claim 1, wherein the edible acid includes at least one selected from between citric acid and maleic acid.

11. The hardness reduction filter according to claim 1, wherein the edible acid discharge member is in the form of a hydrogel and the edible acid is eluted in water.

12. The hardness reduction filter according to claim 11, wherein the edible acid discharge member is formed by combining the edible acid with chitosan or alginate.

13. The hardness reduction filter according to claim 1, wherein the edible acid is combined with a hardness inducing material contained in the water to be crystallized.

14. The hardness reduction filter according to claim 13, wherein the hardness inducing material includes a calcium ion or a magnesium ion.

15. A hardness reduction filter, comprising:
a filter housing having a space formed therein;
an upper cap provided on one end of the filter housing;
a lower cap provided on another end of the filter housing;
a filter provided in the space of the filter housing to filter water flowing into the filter housing;
an edible acid discharge member provided in the filter housing that discharges an edible acid into water when water flows into the filter housing, and
hardness reduction catalysts provided between the filter housing and the filter to remove a hard water material contained in the water flowing into the filter housing.

16. The hardness reduction filter according to claim 15, wherein the upper cap includes an inlet for water to be introduced into the filter housing and an outlet that allows filtered water to be discharged from the hardness reduction filter.

17. The hardness reduction filter according to claim 15, wherein the edible acid discharge member is provided to be closer to the lower cap than the upper cap.

18. The hardness reduction filter according to claim 15, wherein the edible acid includes at least one selected from between citric acid and maleic acid and the edible acid discharge member is a hydrogel.

19. The hardness reduction filter according to claim 15, wherein the filter housing is cylindrical.

* * * * *